United States Patent
Müller

[11] 3,891,905
[45] June 24, 1975

[54] BRUSHLESS D-C MOTOR

[75] Inventor: Rolf Müller, St. Georgen, Germany

[73] Assignee: Papst-Motoren KG, St. Georgen, Germany

[22] Filed: Nov. 27, 1973

[21] Appl. No.: 419,416

[30] Foreign Application Priority Data
Dec. 8, 1972   Germany............... 2260069

[52] U.S. Cl. .............. 318/254; 310/68; 310/268; 318/138
[51] Int. Cl. ............................................ H02p 5/06
[58] Field of Search ........ 310/49, 268, 68; 318/138, 318/254

[56] References Cited
UNITED STATES PATENTS

| | | |
|---|---|---|
| 2,968,755 | 1/1961 | Baermann .................... 318/254 |
| 3,370,189 | 2/1968 | Haydon et al. ................ 310/49 |
| 3,495,107 | 2/1970 | Haydon ......................... 310/49 |
| 3,596,119 | 7/1971 | Goldmann ..................... 310/49 |
| 3,599,050 | 8/1971 | Komatsu ........................ 318/254 |
| 3,671,841 | 6/1972 | Hoffmann ...................... 310/49 |
| 3,757,185 | 9/1973 | Brunner et al. ................ 318/254 |

Primary Examiner—B. Dobeck
Assistant Examiner—John J. Feldhaus
Attorney, Agent, or Firm—Flynn & Frishauf

[57] ABSTRACT

A transducer, such as a Hall generator is located on the stator to control a semiconductor switching element, such as a transistor, in series with the winding of the motor to pulse the winding and generate a driving torque which interacts with the magnets of a permanent magnet rotor. The stator has located thereon a permanent magnet arrangement, for example a single permanent magnet or a plurality which is positioned to generate, together with angular position selective reluctance torque generating means, an additional driving torque in those angular ranges of position of the rotor during which no driving torque is supplied by the pulsed winding, so that the overall torque being applied to the motor, during a revolution of the rotor, is essentially free from gaps. The permanent magnet on the stator is preferably so located that a portion thereof is outside of the rotor field to decrease demagnetizing effects.

36 Claims, 19 Drawing Figures

PATENTED JUN 24 1975 3,891,905

SHEET 6

BRUSHLESS D-C MOTOR

Cross reference to related applications: U.S. Ser. No. 363,290, filed May 23, 1973, U.S. Ser. No. 363,291, filed May 23, 1973 assigned to the assignee of the present application.

The present invention relates to a brushless d-c motor having a permanent magnet (PM) rotor, and a transducer element, such as a Hall generator on the stator to control current flow through the motor winding in dependence on the instantaneous angular position of the rotor with respect to the transducer element, that is, with respect to the stator and the winding thereon.

Various types of brushless d-c motors have been proposed, and published in the literature. For example, the Siemens publication (Siemens Zeitschrift) 1966, pages 690 to 693, describes a motor which uses four separate windings, arranged in a star pattern, and utilizing two Hall generators, and four power transistors, at least, in order to control current flow through the windings. This construction is comparatively expensive and utilizes a large number of parts.

Electronic switching of motors with permanent magnets has, heretofore, required a plurality of components which have to be accurately adjusted; each transducer element, such as a Hall generator, magnetically responsive diode, magnetic field responsive resistor, or the like, must be adjusted in the motor in the proper angular position; appropriate circuit connections must then be made to the windings, to the transducers, and to the other circuit components. If Hall generators, or magnetic diodes are used, the base current for these elements is substantial, thus decreasing the overall efficiency of the motor since the current flowing through these elements does not contribute to driving torque being applied to the rotor of the motor.

U.S. Pat. No. 2,986,684, May 30, 1961, Cluwen, describes a brushless d-c motor which uses a pick-up coil as a position transducer. The pick-up coil has voltages induced therein which control a transistor which, in turn, controls current flowing through the single winding of the motor. This motor is not self-starting. A permanent magnet is located on a stator which magnet generates a sinusoidal torque, acting on the rotor, in order to supplement the drive torque generated by the single winding. Gaps occur between the application of torque to the rotor, subjecting the rotor to substantial variations in applied torque, over a revolution thereof, arising particularly when the driving torque caused by the field coil transfers to torque generated by the permanent magnet.

It is an object of the present invention to provide a permanent magnet brushless d-c motor in which the torque applied to the rotor is essentially free from gaps over an entire revolution thereof, and which is self-starting. Desirably, the motor should further be inexpensive, and have a reasonably good efficiency even for small motor sizes. The output torque available from the motor should be free from gaps of applied torque, and it should preferably be essentially constant over an entire revolution even though electrical energy is applied only during a portion of the revolution of the rotor.

Subject matter of the present invention: Briefly, means are provided, located on the stator, to generate a reluctance torque which is effective to act on the rotor over a selected angular zone of positions thereof; further, a permanent magnet is located on the stator; the permanent magnet and the reluctance torque generating means are so positioned on the stator and shaped, with respect to each other as well as with respect to the magnetic field generated by the motor winding, to provide, upon interaction with the permanent magnet of the rotor, a torque component which is additional to the pulse drive torque generated by the winding and effective during the time that the winding is not energized and, thus, to provide an overall output torque to the rotor which is essentially uniform during the entire revolution of the rotor.

In one embodiment in accordance with the invention, a single position transducer (such as a Hall generator) is used with a single winding, thus reducing the number of components required for the circuit of the motor. It is also possible to use more than one winding, each controlled by a separate semiconductor switch. If two windings are used, only a single position transducer of the Hall generator type is necessary to control the two semiconductor switches so that the efficiency of the motor, including its control circuit, is good. This embodiment is particularly desirable if the required driving torque cannot be obtained by a single permanent magnet located on the stator, due to size limitations or, if the output torque to be supplied to the driven apparatus should vary in relatively wide ranges.

The electromagnetic drive torque generated by the motor winding during operation of the motor is non-uniform over 360° — electrical — or over an entire revolution of the motor, and is thus not suitable for many applications, and its torqueangular position curve is highly unsymmetrical. In accordance with the invention, this electromagnetic torque is supplemented by superposition of two additional torques, generated by the permanent magnet means and by the reluctance torque generating means, so that the output torque applied to the rotor, and hence available at the motor shaft, is essentially free from gaps. Such a motor will also be self-starting and be available to supply full torque upon starting. The torque available at the motor shaft depends on the motor design, that is, on the relative fields generated by the electrical field, by the permanent magnet means and the reluctance torque generating means, and the design output torque should, therefore, be matched to the operating torque required by the apparatus to which the motor is to be connected.

The concept of the present invention can be used with various known motor designs, that is, with axial air gap motors as well as with cylindrical air gap motors. The construction is simple, inexpensive, and permits speed control by a simple circuit. The invention is particularly applicable to small, fractional horse power d-c source and miniature motors, which are used, for example, in fan or blower drives, drives for audio equipment such as cassette tape recorder-reproducers, phonograph turntables and changers, automatic printers, typewriters, and the like. The electrical components of the motor are not subject to wear and tear so that the life of the motor is limited only by design and wear of the bearings. Operating time spans of many ten thousands of hours can be obtained by appropriate bearing design.

The present invention is particularly applicable for external rotor motors. External rotor motors have high axial inertia and any torque variations which may arise upon change in loading of the motor, during operation, are equalized, or balanced so that flywheels, and the like, are not necessary. Many different types of structural designs of the motor are possible.

The invention will be described by way of example with reference to the accompanying drawings, wherein.

Similar parts, or components have similar effect will be given the same reference numerals and will be described only once.

Figure 1:
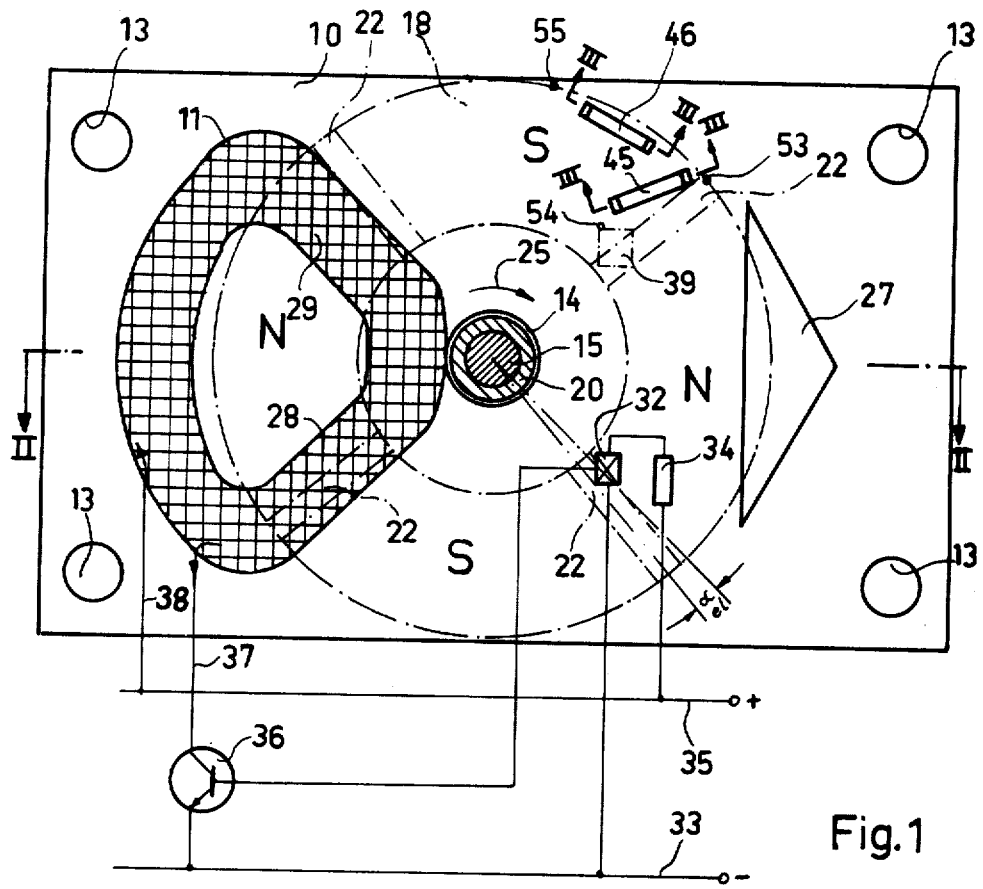
FIG. 1 is a schematic plan view, taken along line I-I of FIG. 2 of a brushless d-c motor constructed as an axial air gap motor with a pair of permanent magnet ring-magnets forming the rotor and, additionally, showing schematically some of the circuit components to be used with the motor.

A stator plate 10 (FIG. 1) made of an insulating material is formed with an opening therein, in which a single coreless flat coil 11 is secured. Plate 10 also carries the required circuit elements for the motor — shown partly in symbolic schematic form removed from the plate. The plate is formed with four attachment holes 13. A shaft 15 extends through a central opening 14 of plate 10. Shaft 15 is secured in bearings, not shown. Shaft 15 has a spacer sleeve 20 extending thereabout, at the terminal ends of which a pair of soft iron disks 16, 17 are secured (FIG. 2), and to which, each, a solid axially polarized ring magnet 18, 19, respectively, is secured. The ring magnets form, between themselves, an air gap 21. Stator plate 10 is located in this air gap. The exact shape of polarization of magnet 18, and magnet 19 (which is the mirror image of magnet 18) is indicated in chain-dotted lines in FIG. 1. The gaps 22 between the poles extend radially outwardly.

Figure 2:
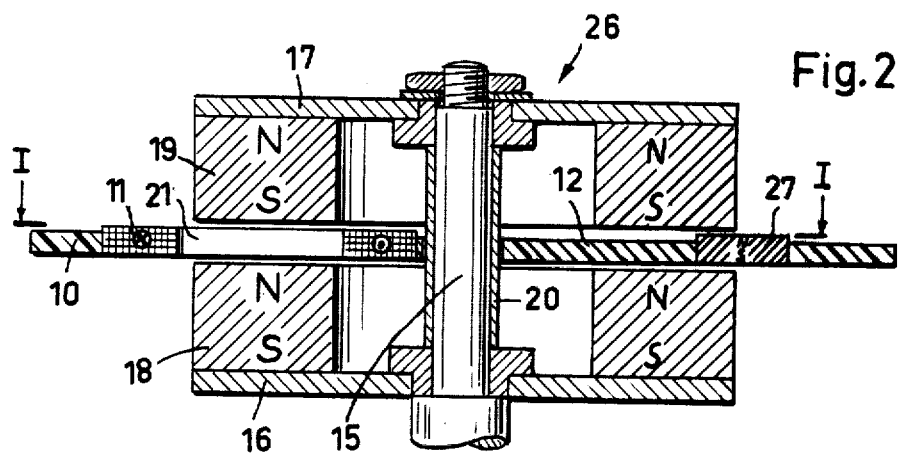
FIG. 2 is a longitudinal section through the motor of FIG. 1 along line II—II of FIG. 1.
Figure 17A:
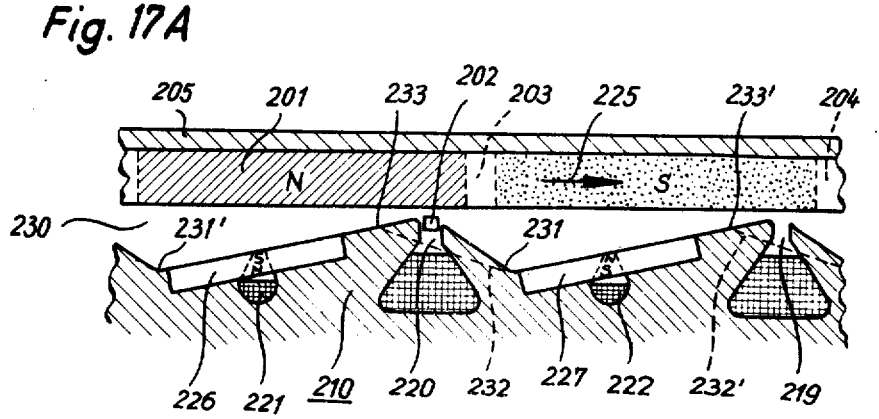
FIG. 17A is a developed view of the air gap portion of the motor of FIGS. 15 and 16, to a greatly enlarged scale, and showing the shape and change in extent of the air gap.
Figure 17B:
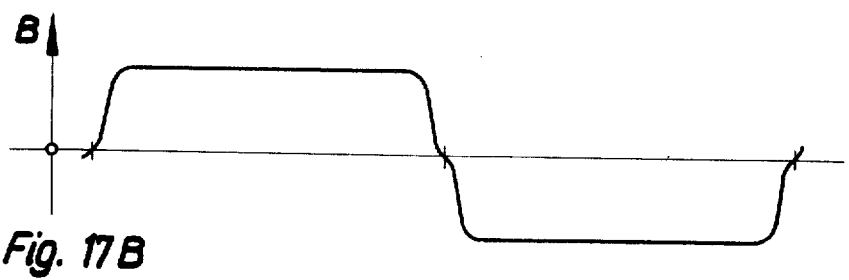
FIG. 17B is a diagram illustrating, with respect to angular position of the rotor, induction due to the permanent magnetization of the rotor.

Magnets 18, 19 are axially polarized (FIG. 2). They have four poles, indicated in customary notation with N (Northpole) and S (Southpole) respectively in FIG. 1. The rotor position shown in FIG. 1 is one of the two starting positions of the rotor. The rotor automatically assumes this position when de-energized. FIG. 17B is a developed view showing the magnetization of the rotor, this is a so-called trapeze-shaped magnetization.

A permanent magnet 27 is secured diametrically opposite to winding 11 in another opening formed in stator plate 10. Magnet 27 is thus 360° — electrical — offset with respect to winding 11. Magnet 27 is likewise axially polarized and is so constructed that the Southpole is below and the Northpole is above, as schematically indicated in FIG. 2, which is the appropriate polarization for the current direction of current flow through winding 11, generating, in operation, a Northpole below and a Southpole above plate 10. Magnet 27 is triangular. The rotating ring magnets 18, 19 would have the tendency to demagnetize magnet 27; to prevent such de-magnetization, when equal poles are opposite each other, ring magnets 18 and 19 as well as the permanent magnet 27 are constructed to have a high coercitive force, in the order of equal to or greater than 2,000 Oersted. Additionally, a portion of the magnet 27 is located outside of the air gap formed between the ring magnets 18 and 19, that is, is outside of the direct field between the ring magnets. The shape of magnet 27 must be selected to so interact with the rotor magnets have the torque applied to the rotor will be as uniform as possible. Magnet 27, as illustrated in FIG. 2, in symmetrically located in air gap 21. This symmetrical location prevents application of unbalanced axial forces to the rotor 26.

Winding 11 is so constructed that the magnetically active portions 28, 29 thereof are approximately 180° — electrical— offset with respect to each other, and extend radially with respect to the central opening 14, that is, with respect to the rotor magnet. The drive torque generated by the winding 11 will be essentially trapeze shaped, and will act on the rotor during about 180° — electrical — of rotation.

Current through winding 11 is controlled by a position transducer. As shown, a Hall generator 32 is used, offset with respect to the winding portion 28 by 180° — electrical — counter the direction of rotation. In operation, current is connected through winding 11 when a Southpole of magnet 18 just begins to meet the portion 28. FIG. 1 illustrates the position in which a pole gap 22 has just passed Hall generator 32. The Hall generator 32 is connected to a negative bus 33, the other connection thereof over a resistor 34 to positive bus 35. One of the two outputs of Hall generator 32 is not used. The other is connected to the base of an npn power transistor 36. The emitter of the transistor is connected to negative bus 33, the collector to a terminal 37 of winding 11. The other terminal 38 of winding 11 is connected to positive bus 35. Direct current will flow in the single winding 11 always in the same direction, so that the magnetic field of coil 11 will always have the same direction. Thus, only a single coil 11 is required and only a single power semiconductor element is necessary to control current flow through the single winding.

It is not necessary to use a Hall generator, and in this embodiment, as well as in the others to be described, other position transducers can be used which provide a signal, depending on rotational position, and essentially independent of speed, or not essentially influenced by speed of the motor. Thus, photoelectronic systems, magnetic diodes, field plates, magnetically dependent resistors, and the like can be used. The position transducer can be shifted by 180° — electrical — for example to the position 39 (FIG. 1); it will only be necessary, then, to connect the other output of the Hall generator to the base of transistor 36.

In addition to the torque generated by the permanent magnet 27, a reluctance torque effective at a selected angular range of positions of the rotor is further provided. To generate this torque depending on the rotational position of the motor, a pair of ferromagnetic elements 45, 46 are located in the axial extension of the magnetically active winding portion 28 of winding 11, that is, offset 360° — electrical — with respect thereto. The ferromagnetic elements 45, 46 are spaced from each other, but are fairly close together. The spacing between the elements 45, 46 is free of ferromagnetic material. The elements 45, 46 are identical, and their shape is clearly seen from FIG. 3. They are preferably made of soft iron sheet metal, by an accurate punching step, and are symmetrical with respect to their transverse axis 44 as well as with respect to their longitudinal axis 47. At their longitudinal ends 48, 48', they are chamfered as seen at 49. Both sides of the elements 45, 46, respectively, form equal air gaps 51, 52 with the rotor. These air gaps are hardly ever exactly equal, even if the elements 45, 46, respectively, are accurately positioned and mounted in the stator plate 10. By arranging the elements as shown in FIG. 2, it is possible to largely compensate for the effect of such dissymmetries, and thus greatly contribute to smooth running of the motor. Preferably, the ferromagnetic elements 45, 46 are connected to plate 10 by means of an adhesive; this adhesive step can be carried out simultaneously with adhering winding 11 and permanent magnet 27 to plate 10.

The longitudinal axes of elements 45, 46 intersect, and the apex of the intersecting angle points in the direction of rotation indicated by arrow 25. This enables locating the two elements 45, 46 within an imaginary triangle having end points 53, 54, 55. The points 53, 54 are located on an imaginary line passing through the winding 11, and end point 55 is located at a position which is offset counter the direction of rotation with respect to this imaginary line. The ferromagnetic volume of elements 45, 46 decreases from the base line formed by lines 53–54, of the imaginary triangle, towards the points 55. Element 45 is essentially parallel to the base line.

Various different arrangements of ferromagnetic elements can be used, within the concept explained, that is, to decrease the overall volume of ferromagnetic material in the direction of the apex point 55 of the imaginary triangle. For example, soft iron pins can be secured to plate 10 and distributed over plate 10 in such a manner that the imaginary triangle between points 53, 54, 55 has iron particles located therein, so arranged that the desired torque distribution is obtained.

Figure 12:
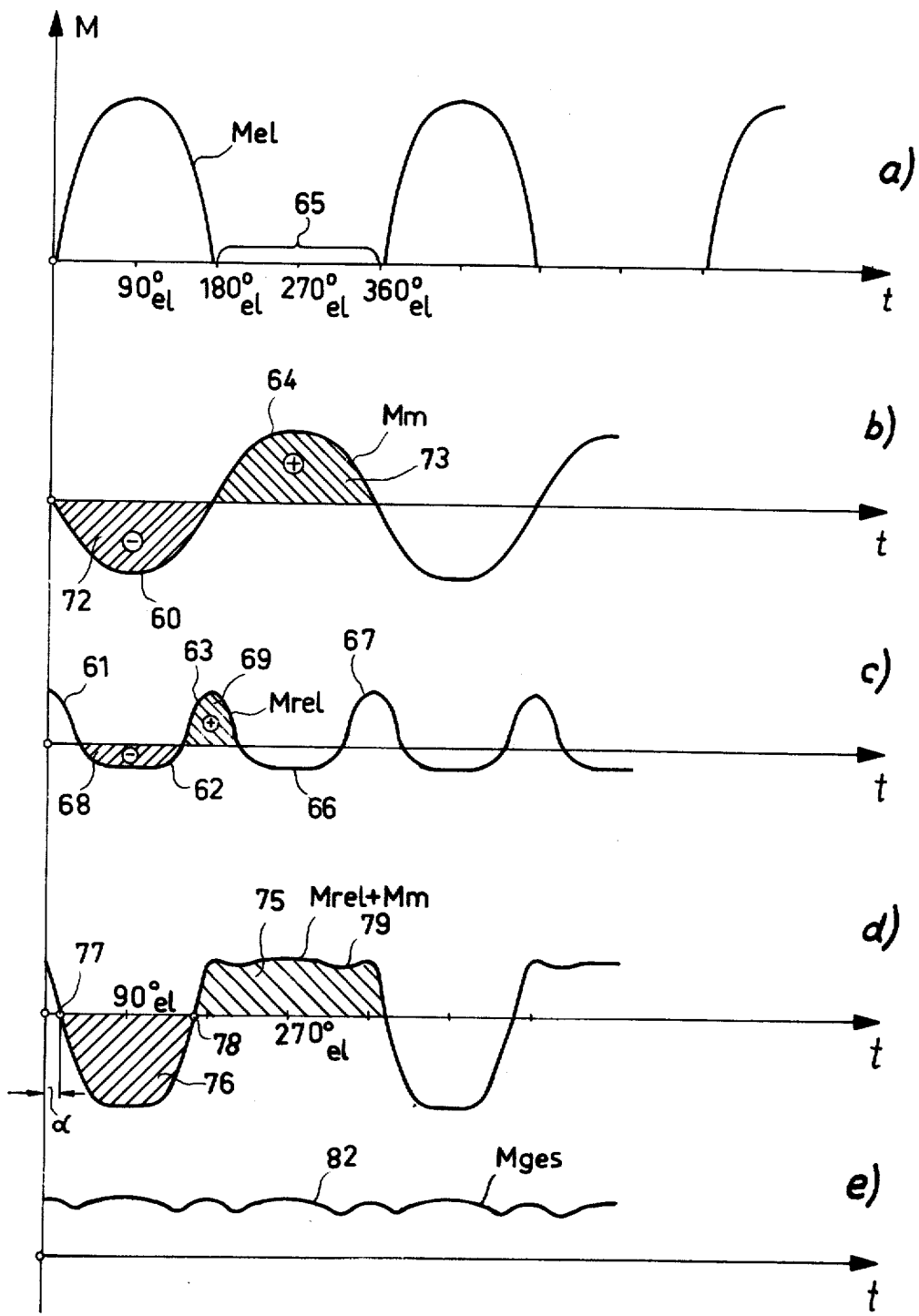
FIG. 12 illustrates in lines a to e a series of graphs, with respect to time (or angular position of the rotor) of torques arising in operation of the motor.

Operation, with reference to FIGS. 1, 2 and 12: When the motor is de-energized, rotor 26 will automatically assume the starting position, illustrated in FIG. 1, or a position which is exactly one half revolution offset with respect thereto, and hence symmetrical. The starting position is obtained by interaction of the magnets of rotor 26 with a. the two soft iron elements 45, 46, and
b. permanent magnet 27.

Permanent magnet 27 has the tendency to attract the opposite rotor poles. If the soft iron elements 45, 46 would not be present, rotor 26 would rotate counter the direction of rotation 25 until Hall generator 32 is exactly opposite a pole gap 22.

The soft iron elements 45, 46 have the tendency to be located intermediate a pole pair, that is, rotor 26 will have the tendency (absent the magnet 27) to rotate in such a position that the soft iron elements 45, 46 are in the middle of a pole pair for maximum magnetic flow therethrough. As clearly seen in FIG. 1, the soft iron elements 45, 46 are offset with respect to the permanent magnet 27 by about 130° — electrical — counter the direction of rotation. Thus, if magnet 27 would not be present, rotor 26 would rotate forwardly by about 45° — electrical, that is, by about an eighth of a revolution. The two torques, that is, the torque caused by the permanent magnet 27 and that caused by the action of the soft iron components interacting with the magnets of the rotor will counteract each other; the starting position will thus be established by a balance determined by the strength and shape of the permanent magnet 27, and its position on the stator, as well as the size and position of the soft iron particles 45, 46, and by the kind of magnetization of the rotor.

Let it be assumed that a direct voltage of, for example 24 V is placed on buses 33, 35. Hall generator 32 will then supply base current to transistor 36. Transistor 36 will become conductive, current will flow through motor winding 11 which causes rotation of the rotor 26 in direction of the arrow 25. The electromagnetic torque supplied by the winding 11 will continue for about a quarter of a rotation (180° — electrical), assuming the four-pole rotor as shown in FIG. 1. This electromagnetic torque $M_{el}$, seen in FIG. 12, graph a, has approximately trapeze shape and extends over somewhat less than 180° — el (180° — electrical).

The drive torque turns rotor 26 so that like poles will be opposite the stator permanent magnet 27. A Southpole will be below the magnet, and a Northpole thereabove. To effect this position, a drive torque is necessary, that is, to counter the torque $M_m$ generated by the magnet 27. This is a braking torque 60, counter to the drive torque $M_{el}$ generated by the winding, and seen in FIG. 12, graph b.

The ferromagnetic elements 45, 46 simultaneously first reach the center of the poles of the rotor at which they provide a drive torque $M_{rel}$, illustrated in graph c of FIG. 12 at 61. Rotor 26 continues to turn, causing the center of the pole to pass the elements 45, 46. A braking torque 62 will result, the extent and time distribution (represented by the shape of the curve 62) being determined by the arrangement of the elements 45, 46. This braking torque is likewise in a direction counter the drive torque generated by the winding 11. This braking torque illustrated at 62, graph c, is overcome just like the braking torque 60 (FIG. 12, graph b) by the electrical drive torque $M_{el}$ (FIG. 12: graph a).

The torque due to the elements 45, 46 will be zero or null when the elements are opposite a pole gap 22. As the rotor continues in its quarter turn, the elements 45, 46 again supply a drive torque 63 to the rotor 26. This drive torque is supplied also when the Hall generator 32 has commanded transistor 36 to block, so that no more current will flow in winding 11.

Rotor 26 will reach a position in which the poles of the magnet 27 will be opposite equal poles of the rotor, after the quarter revolution above described. The rotor will continue to rotate out of this position and will receive a drive torque 64 (FIG. 12, graph b) which overcomes the gap in the electrical torque $M_{el}$ seen at 65 in graph a of FIG. 12 and, further, the braking torque due to the elements 45, 46. This torque seen at 64 will be effective for approximately a further quarter revolution (almost 180° el). At the end of this quarter revolution, elements 45, 46 will provide a reluctance torque 67 (FIG. 12, graph c) to again provide a torque to the rotor until the Hall generator 36 can again command transistor 36 to be conductive and generate a new electromagnetic drive torque $M_{el}$.

The motor in accordance with the present invention thus is self-starting and receives a positive drive torque at all angular positions of the rotor.

The reluctance torque generated by elements 45, 46 is highly non-symmetrical, as seen in FIG. 12, graph c. It is clear that, neglecting losses, the integral of the braking torque 62, as seen by area 68, must be equal to the integral, seen by area 69 and causing the driving torque 63. By suitable choice and selection of materials, and positioning of the ferromagnetic elements with respect to the rotor, it is readily possible to match the torque to be generated by the ferromagnetic elements to motor performance requirements. Likewise, the integral of the torque indicated by area 73 (FIG. 12, graph b) must be equal to the integral of the braking torque indicated by area 72. In the foregoing, hysteresis and other losses have been neglected; these losses can be held small and can be compensated for by suitably increasing the electromagnetic driving torque as seen in FIG. 12, graph a.

The addition of the two magnetic torques $M_m + M_{rel}$ is seen in FIG. 12, graph d. Again, the area 75, above the abscissa must be equal to the area 76 below the abscissa (neglecting losses). The torque curve passes through null at two points 77, 78 during rotation of the rotor over 360° el. Point 77 is offset with respect to zero position, that is, the position of a pole gap 22 over Hall generator 32, by an angle α-el. This angle α-el is, for example, 10° el, corresponding to a geometrical angle of 5° in FIG. 1. This angle is illustrated in FIG. 1 (5°) and corresponds to the starting position. Point 77 corresponds to a stable position of equilibrium of rotor 26; point 78 is an unstable position of equilibrium of the rotor 26, the rotor turning from this position in the one, or the other direction in order to reach a stable position. As can be clearly seen from FIG. 12, graph d, the drive torque illustrated at 79, which is effective during the gap in drive torque from the winding 11, seen at 65 (graph a) is essentially constant, or even. If the torque curves due to the magnetic effects, that is, graph d, is added to the torque generated by current flow in winding 11, as seen in graph a, the overall torque $M_{ges}$ will be seen at curve 82, FIG. 12, graph e. By suitable choice of the parameters, materials, distribution, and field strength of the permanent magnet, winding and current through the winding 11, and of the ferromagnetic elements, the torque $M_{ges}$ can be rendered essentially constant; in any event, there will be no gaps in torque between the torques generated by the winding 11, and the magnet 27.

The offset of the point 77 with respect to null position, that is angle α, may vary within wide ranges, for example between 2° to 40° el; preferably it is selected to be between 5° to 20° el; the illustration of 10° el permits positioning of the respective elements on the stator plate as shown, and provides for reliable starting.

The torques $M_m$ and $M_{rel}$ are determined by the design of the motor, that is, by the design of the permanent magnet and the ferromagnetic elements. Such motors are thus particularly suitable for use where the torque requirements are essentially constant and known, and will fall within predetermined limits; this is the case, for example, in ventilators, blowers, fans, audio equipment such as tape recorders- reproducers, turntables, or the like.

Figure 3:
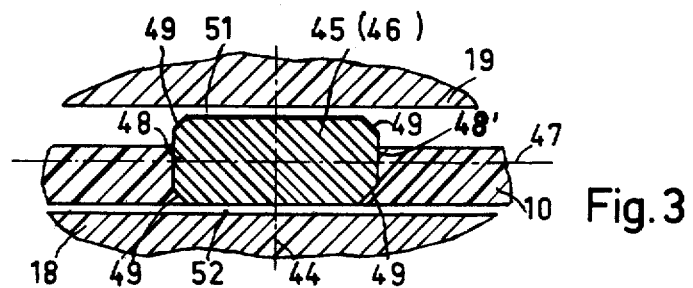
FIG. 3 is a fragmentary section taken along line III—III of FIG. 1.
Figure 5:
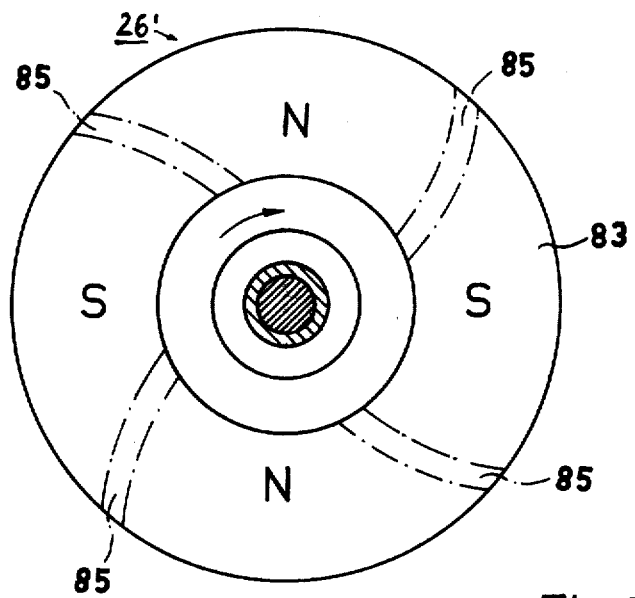
FIG. 5 is a schematic top view of the rotor of FIG. 4, and illustrating, in schematic representation, the magnetization of the rotor, gaps of magnetization being indicated by chain-dotted lines.

The winding 11 of FIGS. 1 to 3 is effective over almost 180° el, and the motor thus operates efficiently. The motor, in accordance with these Figures does, however, have the disadvantage that, in operation, comparatively strong transverse radial forces arise, since coil 11 is effective only on one side of the rotor 26, and the magnet 27 is effective also only on one side of the rotor 26. This requires well designed bearings, and stable construction of the rotor as well as its attachments, in order to reliably prevent vibration or oscillations.

Unilaterally acting radial forces are avoided in the embodiment of FIGS. 4 to 7. The motor is constructed to be essentially symmetrical. This construction results in space problems, particularly the location of the Hall generator 32 and of the ferromagnetic elements 45 and 46. These problems can be solved in the embodiment of FIGS. 4 to 7 by selecting a different shape of the pole gap of the rotor, and of the windings.

Figure 6:
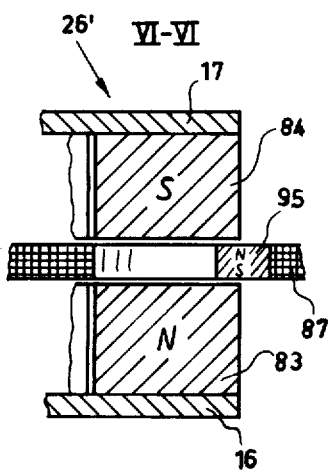
FIGS. 6 and 7 are fragmentary sections along lines VI—VI and VII—VII, respectively, of FIG. 4.
Figure 7:
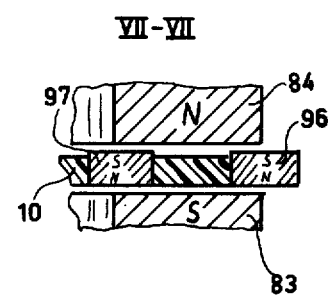

The basic construction of the motor of FIGS. 4 to 7 is similar to that of FIGS. 1 to 3; two massive four-pole ring magnets 83, 84 are provided, secured to soft iron disks 16, 17 (FIG. 6). Mechanically, the construction of rotor 26' is identical to that of rotor 26 of FIG. 2.

The pole gaps 85 of the ring magnets do not extend radially, as in the rotor 26, but rather, they are bent or bowed from the inside towards the outside counter the direction of rotation. The bending of the pole gaps of magnet 84, looked at from the air gap, is the mirror image of that of the magnet shown in FIG. 5.

A pair of flat coils 86, 87 is located on base plate 10', in suitable openings formed therein. The flat coils 86, 87 are connected in series and, together, form the motor winding. This arrangement avoids radial forces, since both coils 86, 87 have equal effects on the rotor 26, in radial direction, and the rotor is thus not loaded asymmetrically. The rotor, further, is more efficiently utilized in this arrangement since all rotor poles can interact with current carrying conductors. The voltage which is induced in the winding, when the winding does not carry current will be much more symmetrical than the voltage induced in accordance with FIG. 1. This voltage, therefore, is better suited for use as a sensing voltage in a speed control circuit.

The legs forming the magnetically active portions 88, 89 of coil 86, and the corresponding portions 90, 91 of coil 87 do not extend radially towards the center of rotation of the rotor, that is, the coils are flattened at their outer sides, and the magnetically active portions 88, 89, and 90, 91 of the coils extend approximately parallel to each other. The shape of the magnetically active portions 88, 91, adjacent the rotor in direction of rotation, is approximately that of the pole gaps 85 (see FIG. 4); the interaction between rotor 26 and the portion of the coil having approximately similar shape as the pole gap will correspond to that in FIG. 1.

The other side of the coils, that is the coil portions 89, 90, respectively, extend at an angle to the pole gaps 25. This angle encloses a wedge-shaped zone in which Hall generator 32 can be located, on the one side, and ferromagnetic elements 45, 46 on the other. The elements 45, 46 are identical to those of FIG. 1, and can be located in their proper angular position. If the coils would not be reduced at their outer circumference, and the pole gaps 85 would extend radially, Hall generator 32 and ferromagnetic elements 45, 46 would have to be mounted above the coils. This is very difficult to carry out, in view of space limitations, and would require a wider air gap. The use of the wedge-shaped zone is well illustrated in FIG. 4.

The permanent magnet of FIG. 1 is replaced by a group of permanent magnets 94 – 99, located on stator plate 10'. One permanent magnet element 94 is located inside of coil 86, having a Northpole above and a Southpole below; a second permanent magnet 95 is located within coil 87 (North above, South below) and four permanent magnets 96, 97 and 98, 99 are located along a line perpendicular to the center line of coils 86, 87. Permanent magnets 96 to 99 have their Southpoles above and Northpoles below throughout, and are thus reversed with respect to magnets 94, 95. All the permanent magnets are partially within the air gap 21 and partially outside of the air gap 21, in order to avoid the demagnetizing effect in operation. The permanent magnets must be slightly offset, due to the inclined direction of the pole gaps in order to obtain the proper shape and phase position of the torque $M_m$ (FIG. 12, graph *b*) generated by all the permanent magnets, taken together.

The position and arrangement of the elements 45, 46 is similar to that in FIG. 1 and the desired shape and phase position of the torque generated thereby, FIG. 12, graph *c* $M_{rel}$, is maintained.

Rotor 26' is illustrated in its starting or stable balance position. A Southpole is beneath Hall generator 32, A Northpole is above the Hall generator 32, so that Hall generator 32 will tend to render transistor 36 conductive. The operation, and the torque relationships correspond essentially to the description in connection with FIG. 1. The permanent magnets are distributed over a plurality of positions, which further improves the balance of forces acting on the rotor, and improves the quietness of its operation.

Figure 8:
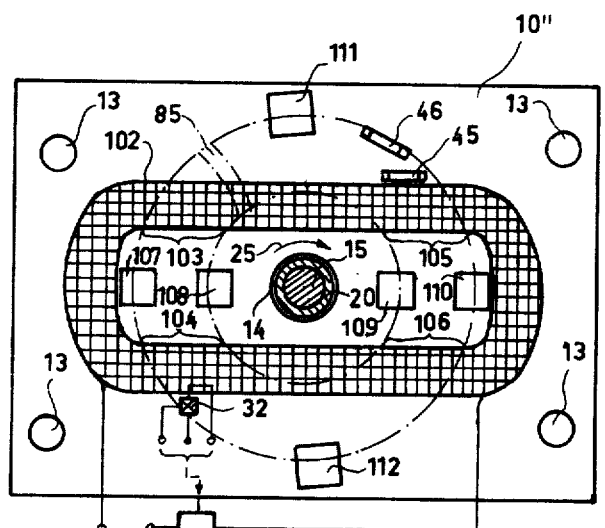
FIG. 8 is a top view similar to FIG. 1 of a third embodiment of an axial air gap motor, the rotor thereof being identical to the rotor of the second embodiment illustrated in FIGS. 4 to 7.

In the embodiment of FIG. 8, a single coil 102 is used, extending transverse of the rotor. The winding of the coil 102 is a wave winding. The construction of the rotor is identical to that shown in connection with the embodiment of FIG. 4; the pole gaps 85, only one of which is shown, are inclined, or bowed. The rotor is a four-pole rotor, utilizing trapeze-shaped magnetization, as discussed in connection with the embodiment of FIGS. 1 to 3, and also used in the embodiment of the motor of FIGS. 4 to 7.

Figure 4:
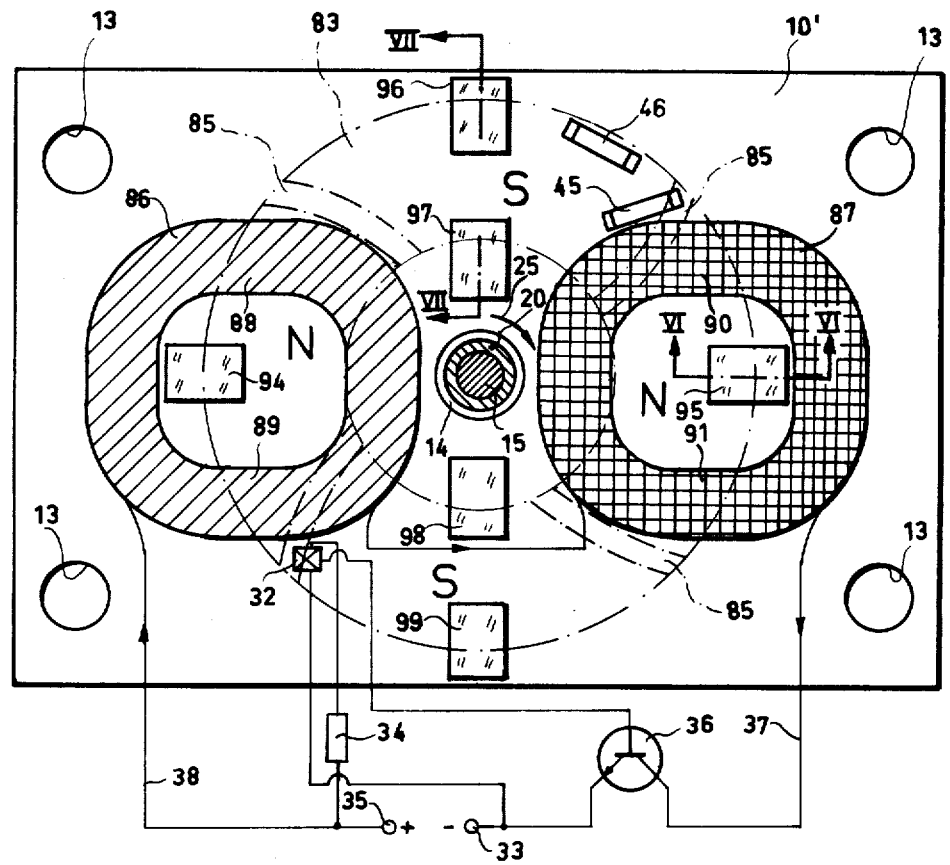
FIG. 4 is a top view, similar to FIG. 1, of a second embodiment of the motor.

The magnetically active portions 103 to 106 of the coil 102 correspond to the portions 88 to 91 of FIG. 4; magnetically, therefore, the relative relationships will be the same. Hall generator 32 and elements 45, 46 are similarly arranged as in FIG. 4. Six permanent magnets are used, two outside of the coil and four within the coil. The six permanent magnet elements 107 to 112 are so arranged that elements 107 to 110, having their Northpoles above and Southpoles below are located within the center space of the coil 102 (see FIG. 8). Offset by approximately a quarter revolution are two further permanent magnet elements 111, 112, with North below and Southpole above; again, the polarity of the poles of the magnets outside of the coils are reversed with respect to those inside of the coils. All permanent magnet elements are disposed partially within the air gap defined between the magnets of the permanent magnet rotor, and partially outside thereof to prevent demagnetizing effects.

FIGS. 4 and 8 clearly show that there are, overall, eight positions in which permanent magnets can be located when a four-pole axial air gap rotor is used. The selection of the particular position of the magnets depends on design requirements. The ferromagnetic elements 45, 46 can be offset by 180° el therefrom, or by $n \times 180°$ el (where *n* is an integer of 0, 1, 2 . . .). For reasons of symmetry, a greater number of such elements can be used, symmetrically located on the stator.

Operation of the motor of FIG. 8: In all essential respects, the operation of the axial air gap motors of the preceding examples is the same and reference may be had to FIG. 12 for torque relationships.

Figure 9:
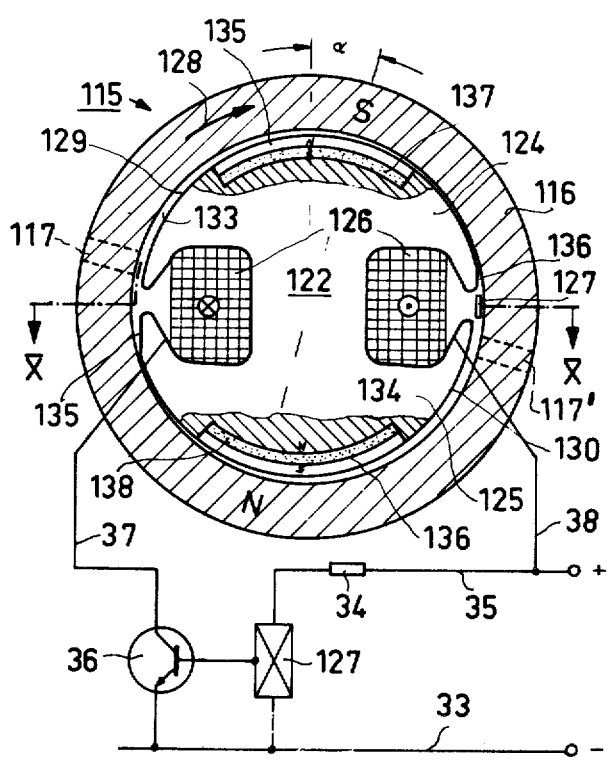
FIG. 9 is a schematic sectional view taken along line IX—IX of FIG. 10 and illustrating an external rotor motor embodying the invention.
Figure 10:
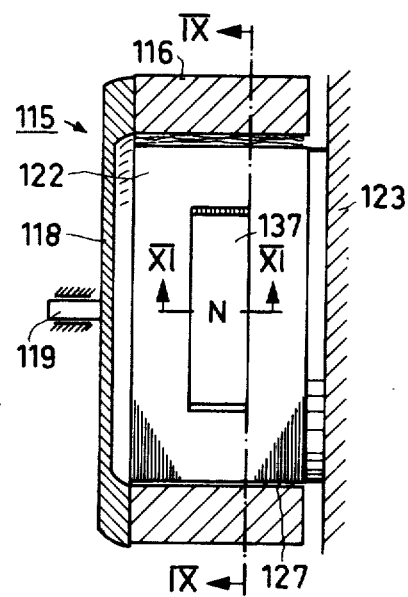
FIG. 10 is a longitudinal view of the motor of FIG. 9 taken along line X—X of FIG. 9.

An external rotor motor in accordance with the present invention is seen in FIGS. 9 and 10. The external rotor 116 of the motor 115 may have ventilator fans, blower vanes, or the like directly connected to the outer circumference of the rotor. The rotor is formed as a two-pole magnet ring. The pole gaps are indicated at 117, 117'. The two poles are shown in conventional representation as N and S. Rotor 116 is illustrated in FIGS. a and 10 in the starting position; and in FIG. 11 rotated by a half revolution with respect thereto. Rotor 116 has an end plate or end bell 118 which is connected to a shaft 119, retained in a suitable bearing shown only schematically. The entire mechanical construction of the motor of FIGS. 9 and 10 is only schematic since any known construction for external rotor motors can be used.

Stator 122 is secured to a fixed portion 123 of the motor. It is a double salient motor (a double T-shape). The ends of the salient poles 124, 125 almost meet each other, leaving just enough room to introduce the single motor winding 126. The position of Hall generator 127 is indicated in FIG. 9, both in the motor diagram as well as in the schematic diagram, and also seen in FIG. 10. It is 90° el offset with respect to the coil axis. Hall generator 127 could, of course, also be located exactly diametrically opposite (the so-called "9-o'clock position"). The direction of rotation is shown by arrow 128. Pole gap 117' has just passed the Hall generator 127 and is shifted with respect thereto by an angle $\alpha$. This is the same angle $\alpha$ previously referred to in connection with FIG. 12, graph *d*.

The poles 124, 125 are so shaped at their circumference that the air gap is sawtooth-shaped, that is, the distance of their surfaces 129, 130 from the central axis of the motor increases from one end of the pole shoe to the other, in the direction of rotation. The air gap, therefore, decreases correspondingly in the direction of rotation. The effect is similar to that of the location of the ferromagnetic elements 45, 46 in the preceding examples. The magnetic reluctance of the magnetic path is dependent on the angular position of the rotor with respect to the stator, that is, with respect to the winding of the motor. This, then, results in an asymmetrical reluctance torque being applied to the rotor. As seen in FIG. 9, the decreasing air gap 133, 134 extends over about 90° of the associated angle of the pole shoe, the air gap then slightly increasing from the minimum position of width of air gap at points 135, 136, shortly before the terminal end of the pole shoe itself.

A recess 135, 136, respectively, in the end faces of the salient poles 124, 125 is provided to receive a permanent magnet element 137, 138, respectively. Permanent magnet element 137 located in pole 124 is so positioned that its N-pole is at the outside, its S-pole at the inside; the permanent magnet 138 is so located that its S-pole is outside and its N-pole is inside. This corresponds, for example, to the embodiments explained in connection with FIGS. 4 and 8, in which the poles of the permanent magnets, located 180°-el offset from each other, are reversed with respect to each other. A single PM element would be sufficient in the embodiment of FIGS. 9 to 11; this, however, would result in asymmetrical radial forces being applied to the rotor.

The circuit is similar to that of the previous Figures and the same reference numerals have been used throughout.

Figure 11:
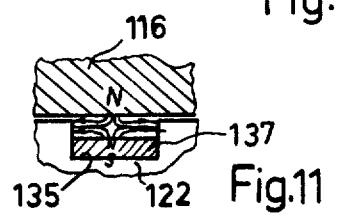
FIG. 11 is a fragmentary cross-section taken along line XI—XI of FIG. 10, and in which the rotor has been rotated by about half a revolution with respect to FIG. 9.

The PM 137, 138, respectively, is seen, in detail, in FIG. 11, located in a respective recess 135, 136 of the stator. As can be clearly seen from FIG. 11, when like poles are opposite each other, flux can deviate laterally, so that the PM 137 (138, respectively), which is a high field strength magnet, is not demagnetized.

Operation: Motor 115 of FIGS. 9 to 11 operates essentially similarly to the operation described in detail with the prior examples. In the quiescent or start condition, PM 137 has the tendency to rotate the S-pole of rotor 116 counter the direction of rotation 128 to align with the S-pole of rotor 116. This tendency to align the poles of the rotor 116 with the opposite pole of PM 137 is countered by the tendency of the rotor S-pole to position itself, in the direction of rotation 125, at the location of smallest air gap, that is, of minimum reluctance of the magnetic path. A balance will be obtained, and rotor 116 will locate itself in such a manner that there will be a balance of torque being applied to the rotor by the oppositely acting magnetic forces thereon. Depending on the constructional details of the motor, a comparatively small angle $\alpha$, in the order of magnitude of about 2° to 40°-el, preferably about 5° to 20°-el will be obtained. The small angle $\alpha$ is of importance to permit self-starting of the motor.

After energization, transistor 36 is rendered conductive, since Hall generator 127 will be facing a magnet (not a gap between magnets) and, in the example, will have a facing S-pole, causing a magnetic field to be established by winding 126, which has the tendency to rotate rotor 116 in the direction of rotation 128. The N-pole of rotor 116 is pulled in the direction of the N-pole of PM 137, and S-pole of rotor 116 is pulled in the direction of S-pole of PM 136. The result will be a braking torque being applied to the rotor 116, as seen in FIG. 12, graph b. This braking torque is overcome and exceeded by the electrical drive torque $M_{el}$. Simultaneously, S-pole of rotor 116 moves towards a position of minimum air gap; likewise, N-pole of rotor 116 moves to a position of minimum air gap, so that, due to the change in reluctance path of the air gap, torque 61 (see FIG. 12) will result. Upon increase of the air gap, a braking torque 68 will be applied to the rotor, likewise overcome by the electrical drive torque. The reluctance braking torque is succeeded by a reluctance drive torque 63 when the poles again approach a region in which the air gap is decreasing. During the torque gap 65, a positive torque is applied to the rotor 116 first by the reluctance torque 63, due to the decreasing width of the air gap, and by the attracting force, that is torque 64, resulting from attraction of the rotor poles by the unlike stator poles of the PM in the stator. A subsequent reluctance drive torque 67 will fill in the remainder of the gap in torque being applied to the rotor during a full revolution, that is 360°-el thereof. Thereafter, and when the rotor 116 has completed a full revolution, the motor winding is again energized and the cycle will repeat.

Essentially the same construction can be used for an internal rotor motor, the air gap being then designed to be the mirror image of that discussed in connection with FIGS. 9 to 11. For reasons of symmetry and to avoid dynamic unbalances, the stator should be so shaped that its pole shoes provide a non-circular air gap which is in non-uniform throughout its circumference.

The speed of the motor can easily be controlled by a suitable control ciruit. A signal corresponding to actual speed is obtained. This signal, for example, is a voltage u which is induced in the motor winding M (corresponding, for example, to winding 11 of FIG. 1) by the rotating permanent magnets of the rotor, when the motor winding M does not carry current, that is, in the gaps between energization. The motor winding M is energized in the periods shown in FIG. 14 at T1, T2, T3; as can be seen, the voltages induced in the windings are essentially sinusoidal. If the voltage is not to be derived directly from the motor winding, the motor winding M can be wound as a bifilar winding, and the second winding 141 then connected to a rectifier bridge 142 from which the voltage u can be obtained.

Motor winding M is connected to positive bus 35 and, as described, to the collector of transistor 36, the emitter of which is connected to negative bus 33. For speed control, additionally, the anode of a diode 143 is connected to the terminal of the motor winding M which is not connected to positive bus 35; the cathode of diode 143 is connected over a negative temperature coefficient (NTC) resistor 144 and a potentiometer 145 with positive bus 35. The tap or slider of the potentiometer 145 is connected to the cathode of a Zener diode 147. A smoothing capacitor 146 is connected between the tap or slider of the potentiometer 145 and positive bus 35. The anode of Zener diode 147 is connected over a resistor 148 with the base of an npn transistor 149 and over a resistor 150 with the negative bus 33. A further smoothing capacitor 153 which is, however, not strictly necessary, may be connected between the base of transistor 149 and positive bus 35.

A voltage divider formed of resistors 154, 156, with a tap point 155 therebetween is connected between the collector of resistor 149 and negative bus 33. The tap point 155 is connected to the base of an npn transistor 157, the collector of which is connected over resistor 34 with positive bus 35, and the emitter of which is connected to a supply input of the Hall generator H, the other terminal of which is connected to negative bus 33. The control output of Hall generator H is connected to the base of transistor 36. The other control output of Hall generator H is not used. The Hall generator H, typically, corresponds to Hall generator 32 of FIGS. 4 and 8, or the Hall generator 127 of FIG. 9; motor winding M corresponds to winding 11 of FIG. 1, windings 86, 97 of FIG. 4, winding 102 of FIG. 8, or winding 126 of FIG. 9.

Figure 13:
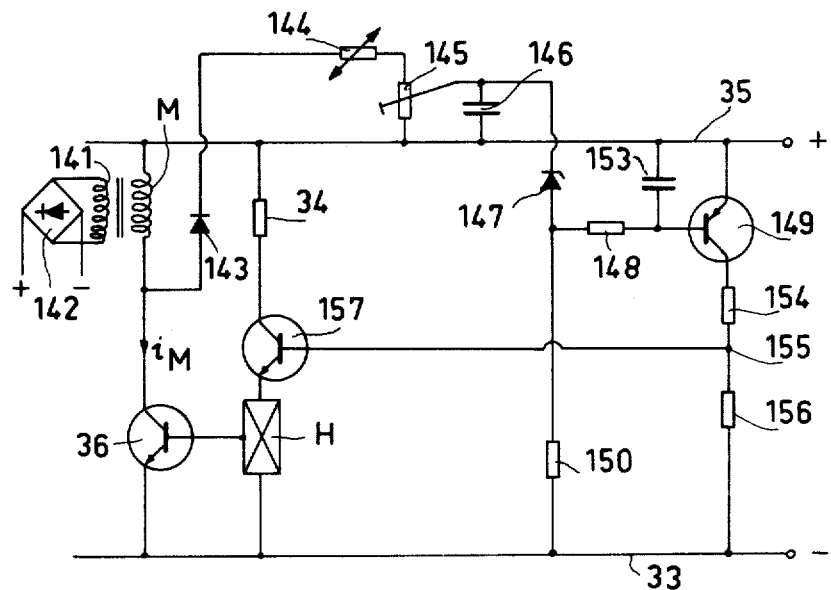
FIG. 13 is a schematic diagram of a speed control circuit for the motor of the present invention.
Figure 14:
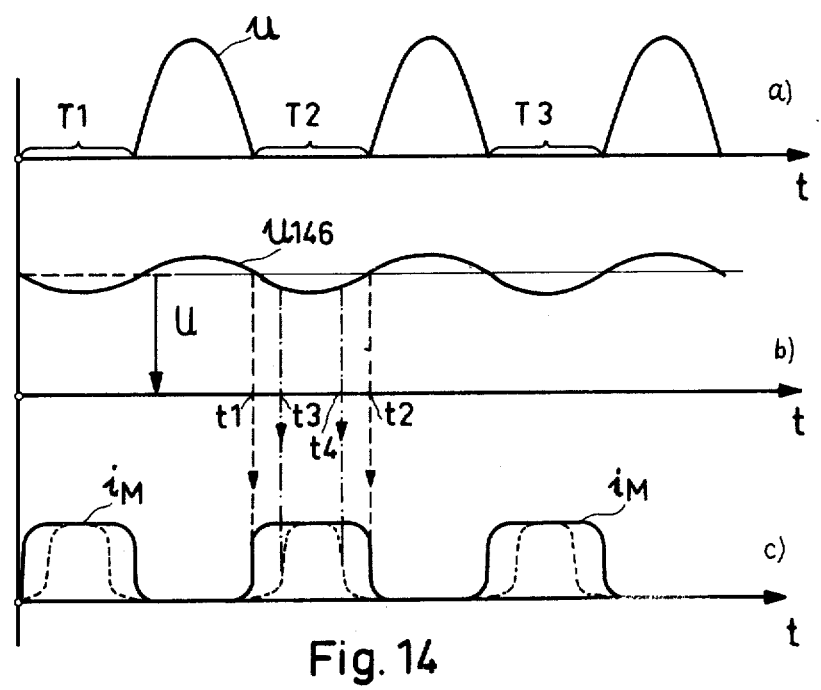
FIG. 14 is a series of diagrams illustrating the operation of the control circuit of FIG. 13.

Operation of circuit of FIG. 13, with reference to FIG. 14: If the speed of the motor is below the command speed as set by the position of the slider of potentiometer 145, then the induced voltage u (FIG. 14, graph a) has a relatively low value. The d-c component U of the smoothed voltage $u_{146}$ — FIG. 14, graph b — at capacitor 146 is relatively small, so that the voltage at the base of transistor 149 is held so low by Zener diode 147 that transistor 149, and hence transistor 157 are continuously conductive. Commutation, that is, repetitive cycling of current flow through the winding M of the motor will, therefore, be controlled entirely by the Hall generator H, that is, by rotor position, and the motor will be supplied with full starting current.

At a certain speed, set by the position of the tap point or slider of potentiometer 145, the d-c component U of the smoothed voltage $u_{146}$ becomes so great that, due to the remaining undulation of this voltage, the transistor 149 will block when its base will become more positive than positive bus 35. Transistor 149 will, therefore, become conductive only when the undulation of the voltage $u_{146}$ is at a low or valley point, that is, approaches its minimum. If the actual operating speed is still quite different from the command speed, transistor 149 will be conductive for an appreciable period of time and, hence, cause transistor 157 to become likewise conductive, for example between the periods $t_1$ and $t_2$ (graphs b, c, FIG. 13). A comparatively wide current pulse will thus be applied to the motor winding; in other words, the angle of current flow, during 180°-el will be great. Current $i_M$ will flow in transistor 36 during these time periods. $t_1$, $t_2$. If the actual speed increases, causing, effectively, an increase of the d-c component U, graph b of FIG. 14, transistors 149, 157 will be conductive, for example, only during the time periods $t_3$, $t_4$. This results in a smaller angle of current flow, that is, in a shorter current pulse through motor winding M. As a result, the speed will not increase further, and may even drop slightly. It is to be noted that transistor 36 is connected at the proper period of time for the motor to deliver its maximum torque.

Speed of the motor in accordance with the present invention can thus be readily controlled with a minimum of components, since no special tachometer generator is necessary. The components themselves may, physically, be located on the base plate 10, 10', 10'' of the motor for example.

In some cases it is not possible to locate a permanent magnet of sufficient size in a motor to result in the desired torque being derived therefrom. The permanent magnet to be located on the stator can then be supplemented by an additional magnetic field derived from a further drive winding. Referring to the embodient of FIGS. 15 to 18: Motor 200, which may be a motor having a construction similar to the motor of FIGs. 9 and 10, that is, which is an external rotor motor, has a radially magnetized solid two-pole magnet ring forming rotor 201.

For better visualization of the operation, the N-pole region of the rotor is shown cross-hatched, and the S-pole region of the rotor 201 is stippled. The magnetization of the rotor 201 is shown in FIG. 17B, where the rotor is shown developed; this magnetization, as in the preceding examples, is trapeze-shaped. In actual practice, the shape and form of the magnetization is not exactly trapeze-shaped; the term is, however, used in electrical engineering technology to indicate this type of magnetization, which is characterized by relatively small pole gaps and a wide region of essentially constant and uniforms magnetic field.

The poles S and N of the rotor 201 are separated by pole gaps 203, 204. The magnet ring is secured to a shaft 206 by means of a surrounding shell 205, shaft 206 being rotatably retained in suitable bearings shown schematically only at 207, FIG. 16.

Figure 15:
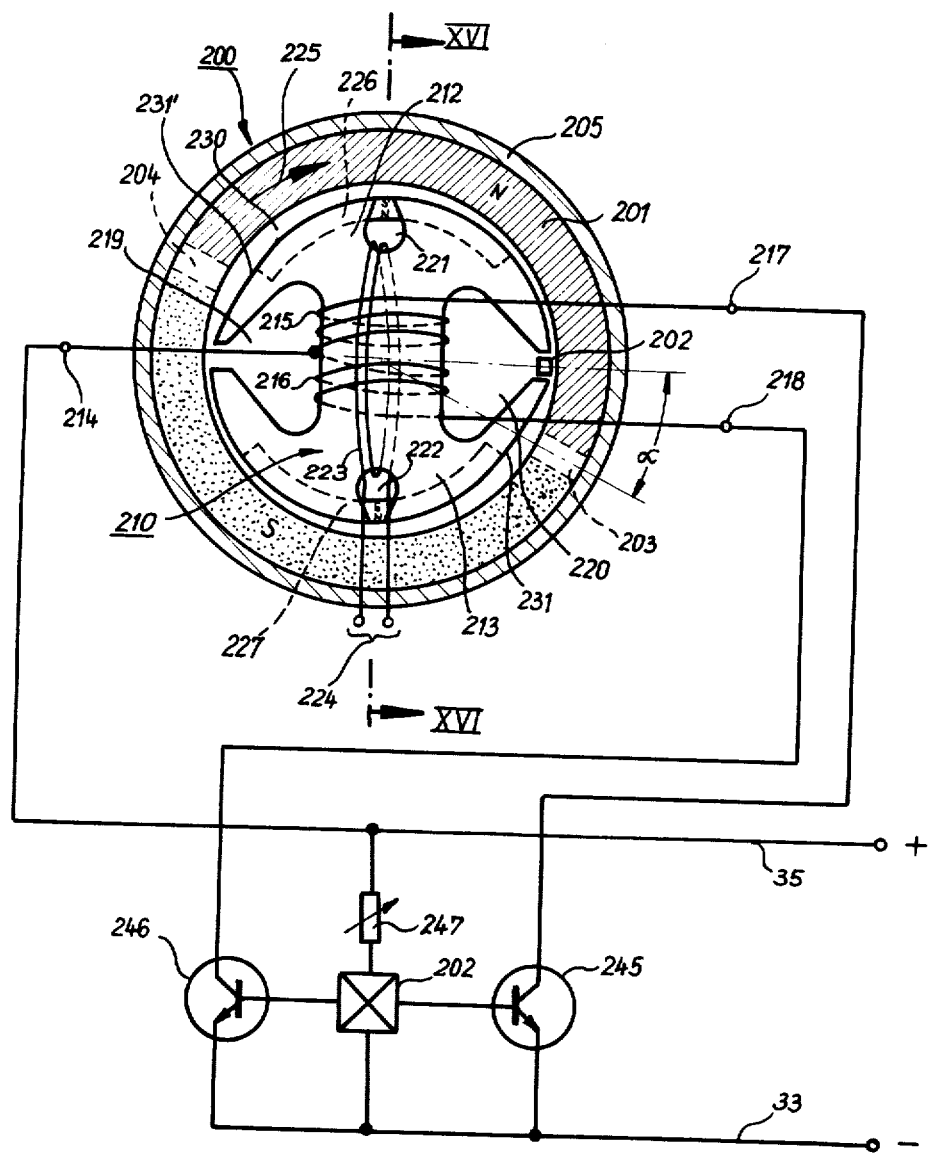
FIG. 15 is a cross-sectional view of a fifth embodiment of the invention, taken along the line XV—XV of FIG. 16, and further illustrating, schematically, control of current flow through the motor windings.
Figure 16:
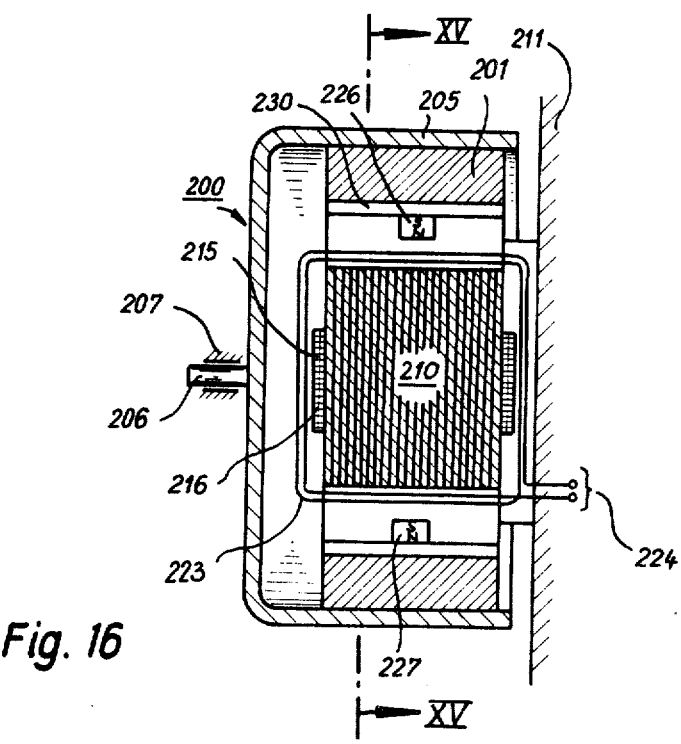
FIG. 16 is a longitudinal section taken along line XVI—XVI of FIG. 15.

Stator 210 is secured to a fixed support 211 (FIG. 16). It is a salient-pole stator of double T-shape. The ends of the salient poles 212, 213 almost meet each other and leave just sufficient room to introduce a pair of windings 215, 216. Windings 215, 216 may be a single series connected circuit with a tap 214, and having end terminals 217, 218 (FIG. 15). Hall generator 202 is located in a notch in a groove of the stator. Windings 215, 216, separately, preferably have wires of unlike diameter, or unlike numbers of turns, so that the Ampere-turns of the windings are not alike. A similar effect may be obtained, of course, by using the same number of windings but different current magnitudes flowing therethrough. Winding 216 may, for example, have the smaller number of turns. The winding slots for windings 215, 216 are seen at 219, 220, FIGS. 15 and 17A.

As seen in FIG. 15, two npn transistors 245, 246 control current flow through the windings 215, 216. Transistor 246 may be a lower power transistor than transistor 245. The emitters of the transistors are connected to negative bus 33; the collector of transistor 245 is connected to terminal 217 and collector of transistor 246 is connected to terminal 218 of the windings 215, 216 respectively. The bases of the transistors are connected to a control output, each, of the Hall generator 202. The current connection of the Hall generator 202 is connected to negative bus 33, and the other over a controllable resistor 247 with positive bus 35. Positive bus 35 is also connected to the tap 214 of the winding.

one of the two winding portions of the winding can replace the permanent magnet on the stator and, therefore, when two windings, controlled separately by respective transistors which, in turn, are controlled by a Hall generator are used, then the permanent magnet in the stator is not strictly necessary. As illustrated in FIG. 15, control of the transistors 245, 246 can be achieved by a single Hall generator. This is a particularly simple control. The invention is particularly suitable in a circuit in which the induced voltage of a pick-up winding 223 is used in order to control transistors 245, 246 since control of the transistors 245, 246 is particularly effective if the rotor has a fixed predetermined starting position; this is obtained by use of the permanent magnet in the stator, in accordance with the present invention, so that the combination of a permanent magnet and pick-up winding 223 is particularly effective.

Two grooves 221, 222 in the stator 210 are provided to retain a pick-up winding 223. These grooves, and hence the windings are electrically offset by 90° with respect to windings 215/216; in a two-pole rotor, the shift is also mechanical by 90°. The pick-up coil 223 can serve as a position transducer; the terminals of winding 223 are brought out at 224.

The direction of rotation is shown by arrow 225; the direction is determined by the shape of the air gap.

A radially polarized permanent magnet 226, 227 is located centrally of the poles 212, 213. Both magnets 226, 227 have their Southpole above and their Northpole below, with reference to FIG. 15. The magnets may, as shown, extend over an angle of about 90° -el. They are preferably secured into a suitably formed groove or notch in the stator, after the pick-up winding 223 has been located in the stator.

The magnet reluctance path of the air gap 230 changes over the angle of rotation, and thus provides a reluctance torque of predetermined shape.

Figure 18:
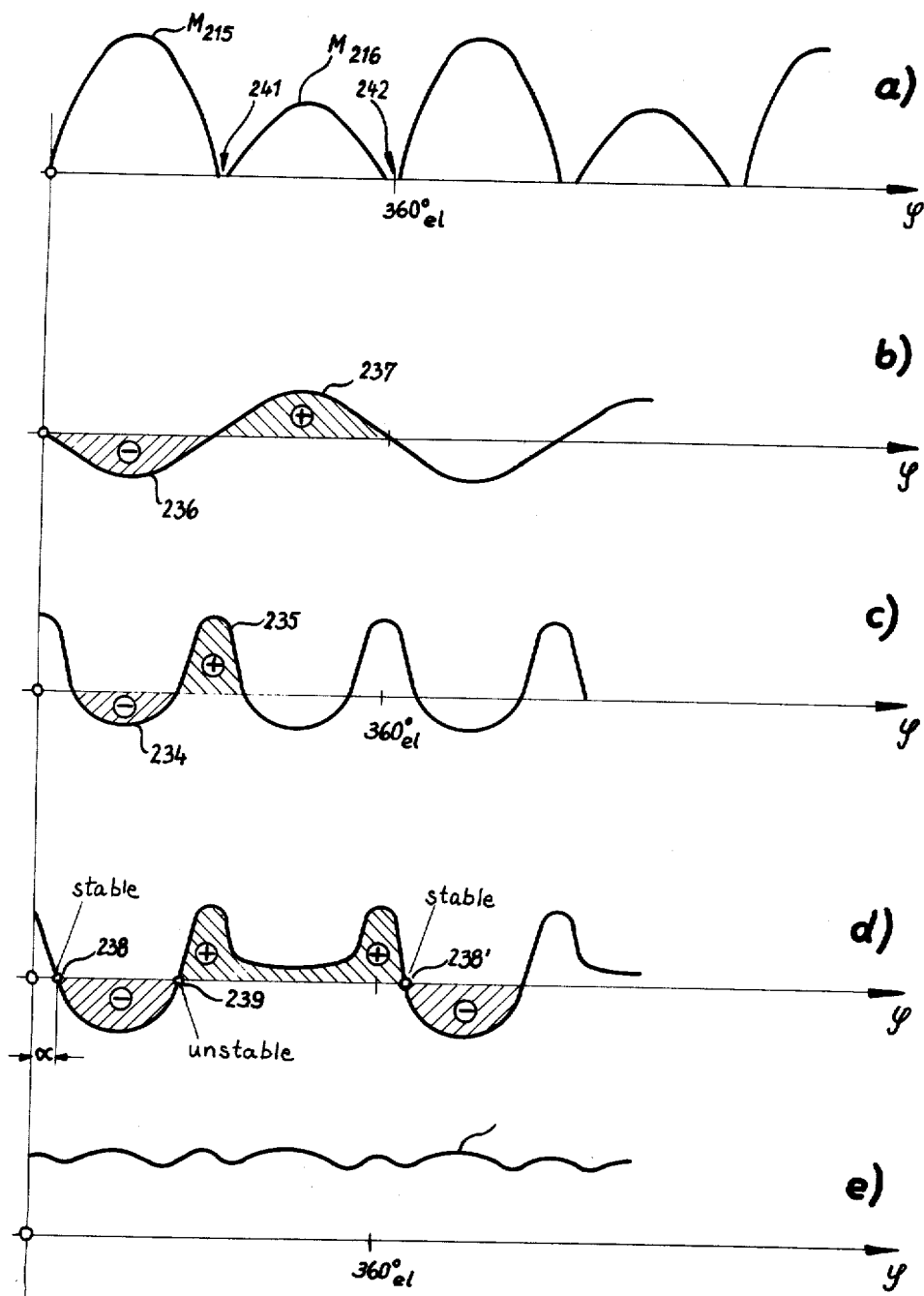
FIG. 18 in lines a to e is a series of graphs illustrating the operation of the motor in accordance with FIGS. 15 to 17A and 17B.

FIG. 18 illustrates the relationship. The outer circumference of poles 212, 213 is best seen from the developed view of FIG. 17A. Measuring in the direction of rotation, the actual air gap 230, which can be measured by means of a measuring instrument such as a feeler gauge, increases — starting from the slots 219 resp. 220 — over a relatively small angle, for example about 30° -el, up to a maximum 231, 231', respectively; from that point on it decreases up to the next slot, when measuring starting from any one of the slots 219, 220. The decrease is essentially linear.

Slots 219, 220, in effect, increase the actual size of the air gap. The equivalent, that is, the magnetically effective air gap can thus be approximated as seen by the dashed lines 232, 232'. This equivalent air gap has minimum positions at 233, 233' and is ahead of the associated slot by about 30° -el, with respect to the direction of rotation. A similar consideration is, of course, valid for the air gap of the motor of FIGS. 9 and 10. Let it be assumed that rotor 201 turns in the direction 225. If a pole gap, for example gap 203 of the rotor passes over a region of air gap which is decreasing, then the rotor 201 must be driven, or torque applied thereto; as seen in FIG. 18, graph c, a braking reluctance torque 234 is applied to the rotor. If, however, such a gap between poles, for example gap 203 passes over a region of extending equivalent air gap, a driving torque 235 (FIG. 18, graph c) will be applied to the rotor. The form of the torques 234, 235 thus, as can be seen, depends on the shape of the equivalent air gap. The torque can thus be matched to requirements by suitably shaping the air gap of the motor.

Permanent magnets 226, 227 likewise result in a torque which is seen in FIG. 18, graph b. If the rotor 201 is shifted from its position as indicated for example in FIG. 15, in the direction of rotation 225, then a torque must be applied thereto. This braking torque is illustrated at 236; approximately 180° -el beyond, the driving torque 237 becomes effective on the rotor.

If the torque curves of FIGS. 18b and 18c are added, then the curve of graph d, FIG. 18, is obtained. This torque distribution can be measured, for example, with a spring scale. The torques acting on the rotor, with the windings de-engerized, can thus be experimentally determined. The torque distribution, as seen in graph d of FIG. 18 has two zero positions, 238, 239. Point 238 corresponds to the stable balance position of FIGS. 15, 17A; the corresponding angle α is entered in FIGS. 15 and 18, graph d. Point 239 corresponds to an unstable position of equilibrium of the rotor, from which the rotor 201 will move at the slightest disturbance. The distance between point 239 and the subsequent stable point 238° is greater than 180° -el, as seen in FIG. 18, which is of importance for the purposes of the present invention since points 238, 239 will then both fall within the first two quadrants (0° to 180° -el) of a full revolution, that is, 360° -el.

Due to the unsymmetrical form of the torque as illustrated in graph d, FIG. 18, which is determined by the geometry of the air gap, and the relative strength of the permanent magnets, the two windings 215, 216 must provide electromagnetic drive torques of different intensity, for example of different amplitude.

The effects of winding 216 and permanent magnets 226, 227 are additive, that is, the winding 216 supports the effect of the PM's 226, 227. The effect of the PM's 226, 227 is, however, counter the torque generated by the other winding 215. In other words, the motor stores a portion of the energy pumped into the motor by winding 215, and partially retrieves that energy in the gaps between generation of electromagnetic torque. These gaps are seen at 241, 242 in FIG. 18, graph a. A further portion of the energy pumped into the motor by winding 215 is retrieved during the drive torque $M_{216}$ applied by the weaker winding 216 and thus supplements the electromagnetic torque $M_{216}$ being applied to the rotor. The drive torque derived from winding 215 is seen at $M_{215}$, and the torque derived from winding 216 is seen at $M_{216}$.

Addition of curves of FIG. 18, graph a, and graph d, results in the curve seen in FIg. 18, graph e, that is, a torque distribution over rotation of the rotor which is free of gaps and essentially uniform. The motor will, therefore, apply an essentially uniform torque to a load, over its entire revolution (electrical). The overall torque $M_{ges}$ is essentially constant.

If the motor is de-energized, it will assume the position corresponding to the point 238, FIG. 18, graph d; in unusual situations, it may assume the position corresponding to the point 239, FIG. 18, graph d. FIGS. 15 and 17A show the rotor in a position 238. Hall generator 202 is located opposite the Northpole of rotor 201; as a result, transistor 245 is controlled to receive current, permitting a high current, that is, a high flux due to a greater number of Ampere turns being derived from winding 215. The motor will start in the direction of arrow 225.

If the rotor 201 should stop in the position at point 239 which, as seen in FIG. 18, graph d, is shifted by about 125° with respect to the position of FIGS. 15 and 17A, in the direction of rotation, Hall generator 202 will still be in the region of the Northpole; thus, even if the rotor should stop in a position of unstable equilibrium (and is not moved out of this position due to bearing friction, or other extraneous influences), Hall generator 202 will still be within the region of the Northpole and winding 215 will be energized upon energization of the motor and the motor will start in a proper direction.

When the Hall generator 202 subsequently will be beneath a Southpole, winding 216 will be energized. Thus, upon starting, first the greater electrical torque $M_{215}$ will be generated by winding 215 and the smaller electromagnetic torque $M_{216}$, generated by winding 216, will be generated only later.

Self-starting, in the proper direction, is thus ensured; a drive torque $M_{ges}$ will be effective on shaft 206 which, as seen in graph e of FIG. 18 is essentially uniform. The clearly defined starting position enables a relatively high starting current to flow over the transistor 245, that is, over the transistor having the higher power capabilities, so that the transistor 246 can be designed to have lesser power capabilities which is a cost advantage for the overall construction of the motor and its control circuitry.

The invention has been described in connection with a two-pole and four-pole motor; it is not limited to such constructions and motors with higher numbers of poles can be similar constructed. Such motors may be required for low rotational speeds, for example for direct drives of tape recorder/reproducer equipment, or record changers and turntables. The current through the motor can be controlled by a single semiconductor switch in accordance with the examples of FIGS. 1–14 and still obtain self-starting, in a predetermined direction, the motor supplying an essentially uniform output torque, free from gaps, so that the running characteristics are smooth and quiet. It is advantageous to separate the portions of the magnetic circuit of the motor winding and the magnetic circuit or circuits of the permanent magnets which pass through the stator. It is desirable to so arrange the motor that these magnetic circuits will be in parallel to each other. Closing of the magnetic circuit, or of the magnetic fields of the permanent magnet or magnets over the stator laminations or magnetic circuit is thus prevented, and premagnetizing of the motor windings is also prevented. This separation is clearly seen in FIGS. 1 to 8. The motor winding is coreless, that is, has an air core. Since no iron is used as a core, premagnetizing of the zone of the motor winding would not be detrimental, however.

In the arrangement of FIGS. 9 to 11, the stator iron circuit may be considered to have two parallel paths; one of them is associated with the two permanent magnets 136, 137, and the other with motor winding 126. These paths can readily be separated, in space, from each other, without changing the operation of the motor in any respect. As seen, permanent magnets 136, 137 cover only a fraction of the associated pole surfaces, that is the associated pole shoes, and they are therefore not connected in series with the magentic circuit of the motor winding 126; rather, their magnetic path is in parallel with that of the motor winding. The same applies to the motor of FIGS. 15 to 17, since it is identical to that of FIGS. 9 to 11 in this respect.

The magnetic circuit of the permanent magnets is thus closed directly over the air gap, that is, the permanent magnets of the motors of FIGS. 9–11 and FIGS. 15–17 are not short-circuited by the stator iron. This is obtained by locating the magnets directly adjacent the air gap, resulting in optimum utilization of the magnetic forces derived therefrom.

Various changes and modifications may be made within the scope of the inventive concept, and features described in connection with any one of the examples may be used, suitably, in the embodiment of any other example.

The various torques arising in the motor can readily be determined by measuring the torque applied to the rotor, for example by suitably connected dynamometers, used statically, balances, and the like. A test motor can be balanced, for example, automatically by means of an acceleration sensor which provides instantaneous acceleration data to the motor, so that the instantaneous torques applied to the rotor can be determined. The torque distribution can then be calculated, manually, or by means of a computer program, and changes in design parameters of the magnetic elements can then be made in order to adjust the magnetic circuits, the strength of the permanent magnets, and the power supplied to the motor to provide output torque which is essentially uniform and even. The magentic elements may be changed, for example, by additionally overdesigning the various magnetic elements (for example elements 45, 46, FIGS. 1–8) and then removing material therefrom, for example by grinding. Thus, the motor can be balanced with respect to instantaneous torque being applied to the rotor, and the test motor then be duplicated in mass production so that motors providing essentially uniform torque and utilizing the least amount of material will thereby be obtained.

I claim:

1. Brushless d-c motor having a stator, an essentially cylindrical permanent magnet rotor (26), a substantially cylindrical air gap between the stator and the rotor, a winding (126; 215, 216) on the stator, transducer means (127; 202) located in fixed relation to the stator, and responsive to the angular position of the rotor and providing an output signal if the rotor has a predetermined relative position with respect to the transducer means, and semiconductor switching means (36; 245, 246) connected to and controlled by said transducer means and controlling intermittent current flow through the stator winding to provide a pulsed drive torque ($M_{el}$; $M_{215}$, $M_{216}$) to the rotor wherein the improvement comprises the substantially cylindrical air gap (133, 134; 230, 231) between the stator and the rotor having nonuniform radial dimension at different circumferential locations to generate an alternating reluctance torque upon rotation of the permanent magnet rotor;

permanent magnet means (137, 138; 226, 227) located on the stator comprising at least one permanent magnet located on a stator pole face, facing the air gap;

said permanent magnet means and said air gap of nonuniform radial dimension being located, shaped, and dimensioned with respect to each other as well as with respect to the magnetic field generated by said winding to provide, upon interaction with the permanent magnet rotor, a torque component (79; FIG. 18-d) which is added to the pulsed drive torque generated by the winding to provide an overall torque ($M_{ges}$) to the rotor which is essentially uniform during the entire revolution of the rotor.

2. Motor according to claim 1, wherein the magnetically active zone of the stator facing the air gap has approximately sawtooth shape and the length of the sawtooth portion of the stator (122, 210) extends over approximately 90 percent of the respective pole pitch.

3. Motor according to claim 1, wherein the permanent magnet means comprises at least one permanent magnet which is so polarized and so located on the stator with respect to the rotor that the permanent magnet generates an oppositely phased braking torque (60, 236, FIGS. 12-b; FIG. 18-b) when the torque pulse ($M_{rl}$, $M_{215}$) is generated by the field of the winding.

4. Motor according to claim 1, wherein the permanent magnet means comprises at least one permanent magnet positioned on the stator to be $n \times 180°$ -el shifted with respect to the stator winding, wherein $n$ is an integer of 0, 1, 2, 3. . ..

5. Motor according to claim 1, wherein the permanent magnet means and the nonuniformity of the air gap generating the reluctance torque are so positioned on the stator, relative to the winding and the parmanent magnet rotor, that energization of the winding of the stator results in a net torque being effective on the rotor to provide for self-starting of the motor.

6. Motor according to claim 5, wherein the permanent magnet means and the nonuniformity of the air gap are positioned on the stator such that, when the winding is de-energized, a rotor position is established, determined by the magnetic interaction of the permanent magnet rotor and said permanent magnet means and the nonuniformity of the air gap which is in advance of the rotor position, in the direction of rotation, at which the tranducer means commands energization of the winding, by an angle of between 2° -el to 40° -el.

7. Motor according to claim 6, wherein the angle of advance of the rotor position is between about 5° -el to 20° -el.

8. Motor according to claim 1, wherein the stator (122) is formed with at least one recess (135, 136) in its pole face, at least one each permanent magnet (137, 138) being located in said at least one recess.

9. Motor according to claim 1, wherein the reluctance torque has a negative amplitude which is smaller than the positive amplitude of the torque acting on the rotor due to the permanent magnet means.

10. Motor according to claim 1, further comprising rectifier means (143) sensing the voltage induced in the motor winding (M) during gaps in current flow through said winding, and resulting in an undulating d-c voltage;
means smoothing the sensed undulating d-c voltage;
and means controlling energization of the motor winding under control of said smoothed undulations.

11. Motor according to claim 10, wherein the means controlling energization of the motor winding comprises reference means and means comparing said reference means with said smoothed undulations, and deriving a pulse control signal commanding energization of the winding.

12. Motor according to claim 1, wherein the motor winding comprises at least two coils (215, 216);
semiconductor switching means (245, 246) controlled by said transducer means connected in circuit with each said coils and controlling energization thereof, one of said coils (215) being connected to provide an electromagnetic field of greater strength than the other (216), said one coil (215) being energized when the interaction of the rotor and said permanent magnet means (226, 227) results in a braking torque (236) being applied to the rotor, said other coil (216) being energized when the interaction of the rotor and said permanent magnet means results in a driving torque (237).

13. Motor according to claim 12, wherein said other coil (216) has a lesser number of Ampere turns than said first coil (215).

14. Motor according to claim 12, wherein the amplitude of the driving torque ($M_{216}$) derived from the other coil (216) is less than the overall torque ($M_{ges}$) being applied to the rotor.

15. Motor according to claim 1, wherein the permanent magnet means located on the stator are positioned to be partly within and partly outside of the magnetic flux path of the permanent magnet rotor.

16. Motor according to claim 1, wherein the nonuniform air gap is shaped to generate a driving reluctance torque and a braking reluctance torque, the braking reluctance torque having portions oppositely phased to the torque pulses generated by the winding, upon operation of the motor, said oppositely phased braking portions being longer in duration than the driving portions of the reluctance torque.

17. Brushless axial gap d-c motor having a stator, a permanent magnet rotor (26), a winding (M; 1; 86; 87; 102) on the stator, transducer means (H, 32) located in fixed relation to the stator, and responsive to the angular position of the rotor and providing an output signal if the rotor has a predetermined relative position with respect to the transducer means, and semiconductor switching means (36) connected to and controlled by said transducer means and controlling intermittent current flow through the stator winding to provide a pulsed drive torque ($M_{rl}$, $M_{215}$, $M_{216}$) to the rotor
wherein the improvement comprises
soft ferromagnetic means located on the stator and generating a reluctance torque by interaction with the permanent magnet rotor upon rotation of the rotor;
and permanent magnet means (27; 94–99; 107–112) located on the stator;
said permanent magnet means and said soft ferromagnetic means generating the torque being positioned on the motor and shaped with respect to each other as well as with respect to the magnetic field generated by said winding to provide, upon interaction with the permanent magnet rotor, a torque component (79; FIG. 18-d) which is added to the pulsed drive torque generated by the winding to provide an overall torque ($M_{ges}$) to the rotor which is essentially uniform during the entire revolution of the rotor.

18. Motor according to claim 17, wherein the soft ferromagnetic means generating the reluctance torque comprises soft iron elements (45, 46) located on the stator spaced from each other.

19. Motor according to claim 17, wherein the permanent magnet means located on the stator comprises an elongated permanent magnet, magnetized transversely to its longitudinal direction and having approximately isosceles triangular shape in plan view, with the apex of the triangle lying outside of the flux path of the rotor.

20. Motor according to claim 19, wherein the permanent magnet means located on the stator comprises a plurality of permanent magnet elements, each permanent magnet element being positioned on the stator to be partly within and partly outside of the direct magnetic flux path of the permanent magnet rotor.

21. Motor according to claim 17, wherein, the rotor is a magnetic disk, the winding comprises at least one flat coil facing the rotor, and wherein the permanent magnet means comprises at least one permanent magnet element located within the outline of the flat coil and positioned at a location of minimum magnetic field generated by said coil when the coil is energized.

22. Motor according to claim 17 wherein he stator is essentially coreless;
and said soft ferromagnetic means comprises at least one soft iron element (45, 46) located on the stator.

23. Motor according to claim 17, wherein the permanent magnet means comprises at least one permanent magnet which is so polarized and so located on the stator with respect to the rotor that the permanent magnet generates an oppositely phased braking torque (60, 236, FIG. 12-b; FIG. 18-b) when the torque pulse ($M_{el}$, $M_{215}$) is generated by the field of the winding.

24. Motor according to claim 17, wherein the permanent magnet means comprises at least one permanent magnet positioned on the stator to be $n \times 180°$ -el shifted with respect to the stator winding, wherein $n$ is an integer of 0, 1, 2, 3. . ..

25. Motor according to claim 17, wherein the soft ferromagnetic means are shaped and located on the stator to generate a driving reluctance torque and a braking reluctance torque, the braking reluctance torque having portions oppositely phased to the torque pulses generated by the winding, upon operation of the motor, said oppositely phased braking portions being longer in duration than the driving portions of the reluctance torque.

26. Motor according to claim 17, wherein the permanent magnet means and the soft ferromagnetic means generating the reluctance torque are so positioned on the stator, relative to the winding and the permanent magnet rotor, that energization of the winding of the stator results in a net torque being effective on the rotor to provide for self-starting of the motor.

27. Motor according to claim 26, wherein the permanent magnet means and the soft ferromagnetic means are positioned on the stator such that when the winding is de-energized, a rotor position is established, determined by the magnetic interaction of the permanent magnet rotor and said permanent magnet means and the soft ferromagnetic means, which is in advance of the rotor position, in the direction of rotation, at which the transducer means commands energization of the winding, by an angle of between 2° -el to 40° -el.

28. Motor according to claim 27, wherein the angle of advance of the rotor position is between about 5° -el to 20° -el.

29. Motor according to claim 17, wherein the reluctance torque has a negative amplitude which is smaller than the positive amplitude of the torque acting on the rotor due to the permanent magnet means.

30. Motor according to claim 17, further comprising rectifier means (143) sensing the voltage induced in the motor winding (M) during gaps in current flow through said winding, and resulting in an undulating d-c voltage;
means smoothing the sensed undulating d-c voltage;
and means controlling energization of the motor winding under control of said smoothed undulations.

31. Motor according to claim 30, wherein the means controlling energization of the motor winding comprises reference means and means comparing said reference means with said smoothed undulations, and deriving a pulse control signal commanding energization of the winding.

32. Motor according to claim 17, wherein the motor winding comprises at least two coils (215, 216);
semiconductor switching means (245, 246) controlled by said transducer means connected in circuit with each said coils and controlling energization thereof, one of said coils (215) being connected to provide an electromagnetic field of greater strength than the other (216), said one coil (215) being energized when the interaction of the rotor and said permanent magnet means (226, 227) results in a braking torque (236) being applied to the rotor, said other coil (216) being energized when the interaction of the rotor and said permanent magnet means results in a driving torque (237).

33. Motor according to claim 32, wherein said other coil (216) has a lesser number of Ampere turns than said first coil (215).

34. Motor according to claim 32, wherein the amplitude of the driving torque ($M_{216}$) derived from the other coil (216) is less than the overall torque ($M_{ges}$) being applied to the rotor.

35. Motor according to claim 17, wherein the permanent magnet means located on the stator are positioned to be partly within and partly outside of the magnetic flux path of the permanent magnet rotor.

36. Motor according to claim 18, wherein the soft iron elements comprise sheet metal strips (45, 46), having the major surface of the strips extending approximately perpendicularly to the air gap and arranged in the air gap to result in an asymmetrical reluctance torque.

* * * * *